United States Patent [19]
Han

[11] Patent Number: 5,169,359
[45] Date of Patent: Dec. 8, 1992

[54] CONSTANT/VARIABLE SPEED GEAR ASSEMBLY

[76] Inventor: Kyung S. Han, 1922 Coe's Post Run, Westlake, Ohio 44145

[21] Appl. No.: 807,192

[22] Filed: Dec. 16, 1991

[51] Int. Cl.⁵ .............................................. F16H 7/32
[52] U.S. Cl. ..................................... 475/330; 475/231
[58] Field of Search ............... 475/221, 223, 224, 306, 475/329, 330, 230, 231, 237, 238, 239

[56] References Cited

U.S. PATENT DOCUMENTS

| | | | |
|---|---|---|---|
| 2,547,453 | 4/1951 | Egy ........................................ 74/679 |
| 3,114,273 | 12/1963 | Boggs ...................................... 74/678 |
| 3,318,172 | 5/1967 | Cummins ............................. 475/330 X |
| 3,811,341 | 5/1974 | Gorcenski, Jr. ....................... 475/231 |
| 3,818,781 | 6/1974 | Gorcenski, Jr. ....................... 475/231 |
| 3,915,032 | 10/1975 | Ottemann .............................. 475/231 |
| 4,077,278 | 3/1978 | Combastet ............................ 475/330 |
| 4,077,279 | 3/1978 | Gorcenski, Jr. ....................... 475/231 |
| 4,109,551 | 8/1978 | Nemec ................................ 475/306 X |
| 4,762,022 | 8/1988 | Johnshoy ............................ 475/221 |
| 4,854,190 | 8/1989 | Won ................................. 475/330 X |
| 4,860,614 | 8/1989 | Erdmann et al. ................... 475/230 X |
| 4,916,975 | 4/1990 | Combastet ......................... 475/330 X |
| 4,961,719 | 10/1990 | Wildermuth .......................... 474/50 |
| 4,979,931 | 12/1990 | Fleischmann et al. ............ 475/231 X |
| 5,016,493 | 5/1991 | Han ....................................... 74/840 |
| 5,021,038 | 6/1991 | Beigann ............................. 475/237 X |

FOREIGN PATENT DOCUMENTS

| | | | |
|---|---|---|---|
| 989644 | 4/1971 | Canada ................................ 475/221 |
| 1323617 | 3/1963 | France ................................. 475/330 |
| 2638801 | 5/1990 | France ................................. 475/330 |
| 90/02891 | 3/1990 | PCT Int'l Appl. ................. 475/221 |

Primary Examiner—Richard Lorence
Assistant Examiner—Ryan W. Massey
Attorney, Agent, or Firm—Harpman & Harpman

[57] ABSTRACT

A mechanical arrangement of multiple gears with an auxiliary control input for producing variable output from a constant input. The arrangement of multiple gears wherein the control input is a releasing input that determines a relative variable output from a constant source. Combined arrangements of multiple gears will derive a constant output from a variable source by a constant control input regardless of variations of input source.

5 Claims, 1 Drawing Sheet

CONSTANT/VARIABLE SPEED GEAR ASSEMBLY

BACKGROUND OF THE INVENTION

1. Technical Field

This device relates to gear transmissions that provide a variable output from a constant speed power source and a constant output from a variable speed power source in accordance with the varied applications required.

2. Description of Prior Art

Prior art devices of this type have used a variety of different configurations to supply constant output from a variable speed input source. Such examples are well known within the art and use typically electronics and/or manual sensing means to gage the varying ratios between the actual input and the desired constant output required. Such systems are complicated, expensive and are difficult to maintain due to their sensing and managing speed relationship configurations.

Other mechanical methods of maintaining selected constant output from a varied input can be seen in, for example, in U.S. Pat. Nos. 4,961,719, 2,547,453, 3,114,273 and 5,016,493.

In U.S. Pat. No. 2,547,453 a variable speed transmission can be seen having a rotatable cage with multiple enclosed cranks. An annular cam is engaged by the cranks from which the selective output can be driven.

U.S. Pat. No. 3,114,273 defines a variable speed transmission having an elliptical gear trains with inclusive planetary gears. Differential gear pinions oscillate or rock between differential gears with the result that when the differential gear is locked, the remaining differential gear is required to rotate at given ratio.

U.S. Pat. No. 4,961,719 discloses a variable drive transmission using a carrier member mounted on a rotatable crank shaft with a number of spaced pivotally mounted segments that can selectively engage a central sprocket with multiple chain engagement sprockets rotatably secured to each segments.

In applicant's own U.S. Pat. No. 5,016,493 a variable speed gearing assembly is disclosed that relies on the relative orbital size of a variation gear on a rotating crank shaft. A cyclable output is provided with an initial half-cycle due to the interlinking arm configurations.

SUMMARY OF THE INVENTION

A variable output gear assembly with an auxiliary control input to provide a variable speed output from a constant input source and a selective constant output gear assembly to provide a constant output from a variable input by use of a gear assembly that effectively adjusts to variable inputs by varying the relative speed of a control input to maintain the constant output.

DESCRIPTION OF THE PREFERRED EMBODIMENT

Figure 1:
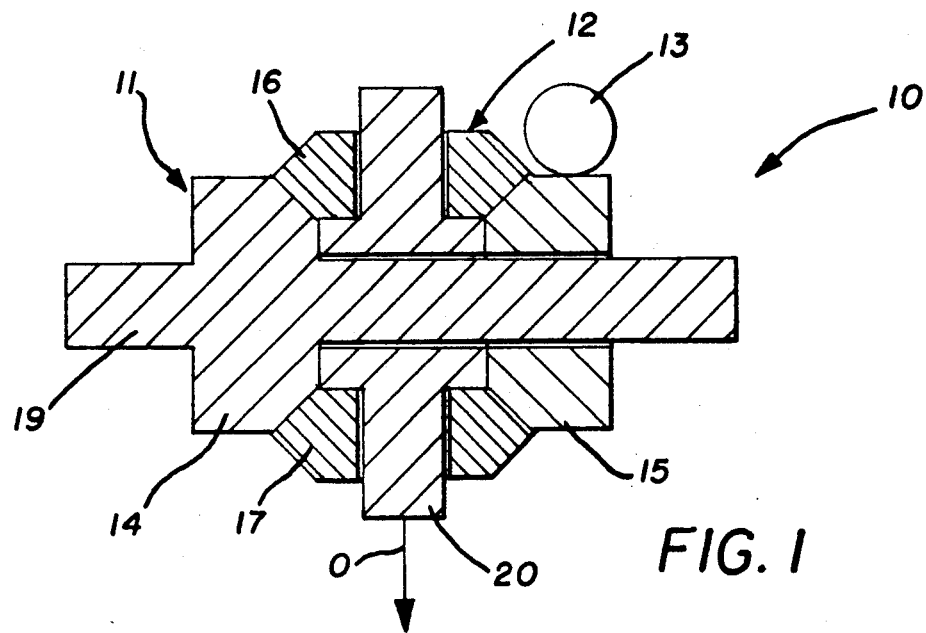
FIG. 1 is a cross-sectional graphic illustrative view of a principal-defining the basic elements of the device.

Referring to FIG. 1 of the drawings, a principal variable speed gear assembly 10 can be seen having multiple pairs of interengaging gears 11 and 12 and control gear element 13. Each of said gear pairs 11 and 12 is defined as having oppositely disposed matching gears 14 and 15 in pair gear 11 and interengaging gears 16 and 17 in gear pair 12. An input and support shaft 19 extends through and between said respective gears 14 and 15 of the gear pair 11 and is integral with said gear 14 while rotatably mounting said gear 15 and gear pair 12. Said control gear element 13 acts as a brake on said gear 15 by selectively restricting its rotation on the input and support shaft 19. The control gear element 13 restricts rotation of the gear 15 that will occur as a result of rotation of the pairs of inner-engaging gears 11 and 12 under input. In FIG. 1 of the drawings a control gear element 13 is shown in its symbolic illustration form to illustrate a releasable geared element well known to those skilled in the art.

It should be noted that the gear assembly shown is used to be illustrative of only one form of the invention which can be accomplished by alternate gear configurations and was chosen to best illustrate and describe the basic principals of the invention as will be discussed in greater detail later.

The gears 16 and 17 of the gear pair 12 are rotatably mounted on a central axis support shaft 20 which is freely rotatable on said support shaft 19 between said gears 14 and 15. It will be evident from the above description that each of the respective gears 14, 15, 16, and 17 within each pair interengagably mesh with a respective gear of said adjacent gear pair in oppositely disposed relationship to one another.

In this illustrative view, the control element gear 13 releases the gear 15 at a selected RPM speed from 0-10, for example, dependent on the desired output of said gear pair 12 which will rotate on the shaft 19 when driven. The principal of variable speed output depicted by the line arrow 0 in FIG. 1 of the drawings of the gear pair 12 is best described as evolutionary depending on the following factors in operation. Given a constant rotatable input speed on the input and support shaft 19 and a non-restrictive mode on the control gear 15, the support output from the shaft 20 will be 0. It will thus be seen that the restriction of the gear 15 by the control gear element 13, a variable output rotation of the shaft 20 can be achieved. Maximum rotational output of this assembly will occur upon total restriction of the gear 15.

In this illustrative example, the input shaft 19 is fixed to the gear 14 of the gear pair 11. The gear 15 is freely rotatable on the shaft 19. This combination could be varied by direct rotational input of the gear 14 by a variation of select input means, not shown.

Figure 2:
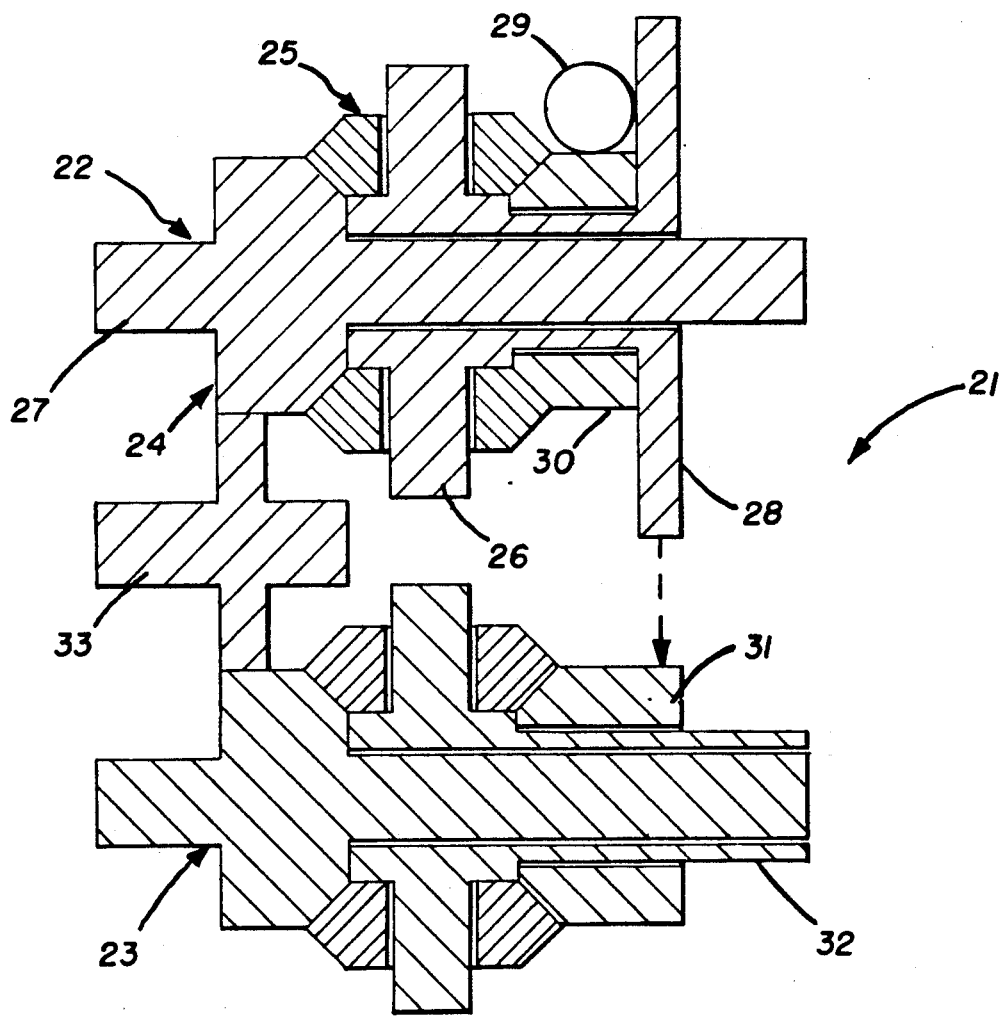
FIG. 2 is a cross-sectional graphic illustrative view of combined principal elements defining a true constant output gear assembly regardless of variations in input.

Referring now to FIG. 2 of the drawings, a multiple gear assembly 21 is shown in which a constant output is achieved from a variable input speed within a given pre-selected range. The multiple gear assembly 21 is comprised of a pair of interconnected modified principal gear assemblies 22 and 23. The gear assembly 22 has multiple interconnected gear pairs 24 and 25 arranged the same as said principal gear assembly 10 hereinbefore described in FIG. 1 of the drawings.

An output drive and support shaft 26 is rotatably positioned on an input shaft 27 transferring output via gear 28 to said gear assembly 23 as indicated by a broken line and arrow in FIG. 2 of the drawings. A first control element 29 maintains a constant driven input to a gear 30 of the gear pair 24. The gear assembly 23 is a third modified form of the principal variable speed gear assembly 10 having the same multiple gear pairs arrangement as hereinbefore described.

In the gear assembly 23, the effective control element is the output gear 28 of the assembly 22 which drives (i.e. controls), a respective control input gear 31 that maintains the constant output of the assembly 23 to a control output shaft 32.

In operation, as illustrated in FIG. 2 of the drawings, an input drive gear 33 drives both gear assemblies 22 and 23 at the same input RPM range for this example 4,500-9,000 RPM with the input of the control element at $-4,500$. When the input is at the lowest range of $-4,500$ RPM the output speed of the gear $298 = (4,500-4,500)/2 = 0$ RPM. Consequently gear 31 which is meshed with gear 28 will also be 0 RPM. Therefore the output of the gear 32 will become $(4,500-0)/2 = 2,250$ RPM. repeating the same calculation, but this time using the input of the highest range 9,000 RPM, gear $28 = (9,000-4,500)/2 = 2,250$ RPM, gear $31 = (-2)(2,250) = -4,500$ RPM then gear $32 = (9,000-4,500)/2 = 2,250$ RPM which is the same as above.

It will be seen that when there is a variation in the input speed by the central drive gear 33, the gear assembly 22 will respond with a matching variable control output via gear 28. The varying control input speed of the gear 31 correspondingly maintains a constant preselected output RPM regardless of the variation of the input speed within the selected range as hereinbefore described. In calculating the final output determined by the gear assembly 23 in this example, it will be dependent on the ratio of the gear selected between the variable output gear 28, the input control gear 31 and the selected variable ratio of the input gear 33 to the gear assemblies 22 and 23. By using the variable control output of the gear assembly 22 (given a constant input at 29) as an input control to said gear assembly 23, a constant output can be maintained.

Thus, it will be seen that a new and novel variable and constant gear assembly has been illustrated and described and it will be apparent to those skilled in the art that various changes and modifications may be made therein without departing from the spirit of the invention.

Therefore I claim:

1. A variable speed gear drive device having a variable input element and a constant output, a first control gear assembly comprising multiple geared paris, an input shaft, a output drive and support shaft rotatably positioned on said input shaft, a control gear element driving one of said gears in said geared pairs on said output drive and support shaft, one of said geared pairs driven by said input shaft and varied by said control gear element in said remaining geared pair selectively varies output to a variable output gear to a second gear assembly, said second gear assembly comprising multiple geared pairs, an input shaft and a control output shaft positioned on said input shaft, one of said geared pairs having a control gear on said control output shaft, driven by said variable output gear of said first gear assembly.

2. The variable speed gear device of claim 1 wherein said variable input element drives said first and said second gear assemblies from a common variable source.

3. The variable speed gear device of claim 1 wherein said control output shaft of said secondary gear assembly comprises one of said geared pairs driven by said input shaft and by said input control gear.

4. A variable speed gear drive device having a constant input and a variable output, said variable speed gear drive device comprising multiple pairs of inner engaging gears, one of said geared pairs rotatably positioned on a central axis support shaft rotatably positioned on a support and input shaft, said central axis support shaft driven by one of said geared pairs, a control gear element releasably engaging one gear within the remaining said gear pair, means for selectively releasing said one gear within said remaining geared pairs, said input shaft driving one gear within said remaining geared pair.

5. The variable speed gear drive device of claim 4 wherein said means for selectively releasing one gear within said geared pair comprises said control gear element.

* * * * *